(12) United States Patent
Le Merrer et al.

(10) Patent No.: US 9,875,658 B2
(45) Date of Patent: Jan. 23, 2018

(54) METHOD OF COMPUTING AIRCRAFT TRAJECTORY SUBJECT TO LATERAL AND VERTICAL CONSTRAINTS

(71) Applicant: THALES, Courbevoie (FR)

(72) Inventors: Mathieu Le Merrer, Toulouse (FR); Benoit Dacre-Wright, Lauzerville (FR); François Coulmeau, Seilh (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 14/958,068

(22) Filed: Dec. 3, 2015

(65) Prior Publication Data

US 2016/0163201 A1 Jun. 9, 2016

(30) Foreign Application Priority Data

Dec. 3, 2014 (FR) ...................... 14 02752

(51) Int. Cl.
| | |
|---|---|
| *G05D 1/00* | (2006.01) |
| *G05D 1/08* | (2006.01) |
| *G05D 3/00* | (2006.01) |
| *G05F 7/00* | (2006.01) |
| *G08G 5/00* | (2006.01) |
| *G06Q 10/04* | (2012.01) |

(52) U.S. Cl.
CPC ........... *G08G 5/003* (2013.01); *G05D 1/0005* (2013.01); *G06Q 10/047* (2013.01); *G08G 5/0034* (2013.01)

(58) Field of Classification Search
CPC .... G08G 5/003; G08G 5/0034; G05D 1/0005; G06Q 10/047
USPC ............................................. 701/4
See application file for complete search history.

(56) References Cited

U.S. PATENT DOCUMENTS

| | | | |
|---|---|---|---|
| 6,085,147 A | 7/2000 | Myers | |
| 8,498,769 B2 | 7/2013 | Sacle et al. | |
| 8,565,938 B2 | 10/2013 | Coulmeau et al. | |
| 2003/0093219 A1 | 5/2003 | Schultz et al. | |
| 2008/0300738 A1* | 12/2008 | Coulmeau | G01C 21/20 701/3 |
| 2010/0198433 A1 | 8/2010 | Fortier et al. | |
| 2012/0059782 A1* | 3/2012 | Pekar | G06F 17/11 706/46 |
| 2013/0046520 A1* | 2/2013 | Bolle | B64G 1/007 703/2 |
| 2015/0268048 A1* | 9/2015 | Seastrand | G01C 21/20 701/528 |

* cited by examiner

*Primary Examiner* — Aaron L Troost
*Assistant Examiner* — Paula L Schneider
(74) *Attorney, Agent, or Firm* — Baker & Hostetler LLP (57) ABSTRACT

A method for computing a setpoint trajectory of an aircraft comprising at least two subsets comprises the formulation and the solving of an optimization problem for the trajectory, and the formulation of the problem comprises at least the formulation of a constraint related to a transition of legs on at least one first subset of the trajectory, and the formulation of a constraint related to a transition of vertical flight phases on at least one second subset of the trajectory. The invention also relates to a system and a computer program for the computation of a trajectory.

20 Claims, 8 Drawing Sheets

```
┌─────────┬──────────┬───────────┬──────────┐
│ ACTIVE ▼│POSITION ▼│ SEC INDEX▼│  DATA  ▼ │
├─────────┴──────────┴───────────┴──────────┤
│ CSTR MANAGEMENT                           │
│           CSTR       STATUTS    TOLERANCE │
├───────────────────────────────────────────┤
│  MEN     10:00:00    10:00:26    [ 30s  ] │
│          -FL135      FL117       [ 250ft] │
│                                           │
│  MLN     240 kts     245 kts     [ 10kts] │
│                                           │
│  ATN     -11:30:00   11:32:06    [ 15s  ] │
│          12000ft     11950ft     [ 100ft] │
│          265 kts     270 kts     [ 10kts] │
│                                           │
│  LFPG    -11:46:30   11:47:10    [ 6s   ] │
└───────────────────────────────────────────┘
```

Labels: 811a (CSTR column), 812a (STATUTS column), 810a (MEN), 813a (30s), 820a (MLN), 821a (240 kts), 822a (245 kts), 823a (10kts), 830a (LFPG), 831a (-11:46:30), 832a (11:47:10), 833a (6s), 800a

```
┌─────────┬──────────┬───────────┬──────────┐
│ ACTIVE ▼│POSITION ▼│ SEC INDEX▼│  DATA  ▼ │
├─────────┴──────────┴───────────┴──────────┤
│ CSTR MANAGEMENT                           │
│           CSTR       STATUTS    TOLERANCE │
├───────────────────────────────────────────┤
│  MEN     10:00:00    10:01:20    [ 90s  ] │
│          -FL135      FL117       [ 250ft] │
│                                           │
│  MLN     240 kts     255 kts     [ INF  ] │
│                                           │
│  ATN     -11:30:00   11:30:20    [ 15s  ] │
│          12000ft     11910ft     [ 100ft] │
│          265 kts     275 kts     [ 10kts] │
│                                           │
│  LFPG    -11:46:30   11:46:33    [ 6s   ] │
└───────────────────────────────────────────┘
```

Labels: 811b, 812b, 810b (MEN), 813b (90s), 820b (MLN), 821b (240 kts), 822b (255 kts), 823b (INF), 830b (LFPG), 831b, 832b, 833b (6s), 800b

FIG.8b

METHOD OF COMPUTING AIRCRAFT TRAJECTORY SUBJECT TO LATERAL AND VERTICAL CONSTRAINTS

CROSS-REFERENCE TO RELATED APPLICATIONS

This application claims priority to foreign French patent application No. FR 1402752, filed on Dec. 3, 2014, the disclosure of which is incorporated by reference in its entirety.

FIELD OF THE INVENTION

The present invention relates to the optimization and the computation of aircraft trajectories. More specifically, it pertains to the construction and the optimization of flight trajectories under constraints, in particular when the latter are lateral and vertical.

BACKGROUND

Most current aircraft possess a flight management system, for example of the FMS type, according to the acronym of the term "Flight Management System". A system of FMS type is in particular described in document U.S. Pat. No. 8,498,769 (SACLE, J et al.). These systems afford an aid to navigation, through the display of information useful to the pilots, or else through the communication of flight parameters to an automatic piloting system. In particular, a system of FMS type allows a pilot or another qualified person to input, during pre-flight, a flight plan defined by a departure point, an arrival point, and a series of waypoints, usually referred to by the abbreviation WPT. All these points can be chosen from among points predefined in a navigation database, and which correspond to airports, radionavigation beacons, etc. The points can also be defined by their geographical coordinates and their altitude. The inputting of the waypoints can be done through a dedicated interface, for example a keyboard or a touchscreen, or else by transferring data from an external device. The computation of the aircraft trajectories can also be performed on ground stations and be transmitted to the aircraft through a data link.

A flight plan then consists of a succession of segments, or "legs" according to the terminology usually used in this technical field, defining the succession of waypoints, but also the type of trajectory or of maneuver to be followed to reach these points or perform the transition to the following segment. Other data can be entered into the flight management system, such as for example those which make it possible to characterize its mass and its distribution. When the aircraft is in flight, the flight management system precisely evaluates the state of the aircraft and the associated uncertainty, by centralizing the data originating from the various positioning devices, such as the satellite-based geo-positioning receiver, the radionavigation devices: for example DME, NDB and VOR, the inertial sensors, etc. A screen allows the pilots to view the current position of the aircraft, as well as the route that the aircraft follows, and the closest waypoints, all on a map background making it possible to simultaneously display other flight parameters and distinctive points. In particular, the information viewed allows the pilots to adjust flight parameters, such as heading, thrust, altitude, climb or descent rates, etc. or else simply to check the proper progress of the flight if the aircraft is piloted in an automatic manner. The computer of the flight management system makes it possible to determine an optimal flight trajectory, related to the minimization of a cost criterion. This cost criterion generally corresponds to fuel consumption, but it can also apply to travel time, to environmental considerations, or to a combination of these criteria.

The construction of a valid flight plan is subject to numerous constraints. Some of them are by nature unavoidable since they are related to physical laws (maximum speed of the aeroplane, maximum deceleration capability, etc. . . . , whereas others are related to performance criteria (for example, cruise at an altitude determined so as to have reduced fuel consumption), criteria of conformity to the procedures published by air traffic control (altitude constraint, speed constraint, time constraint, type of segment and of lateral transition), in-cabin passenger comfort criteria (for example, limit the "jerk", that is to say an abrupt, uncomfortable acceleration experienced).

A flight plan generated by a system of FMS type is in particular constructed with the aid of a horizontal flight plan and of a vertical flight plan, and of transitions between these horizontal and vertical flight plans. The horizontal flight plan essentially contains a list of waypoints that the aeroplane will have to overfly, accompanied by the types of segments and of transitions defining the maneuvers to be followed so as to attain these points, whereas the vertical flight plan contains a list of altitudes of setpoints or constraints, as well as climb, descent and cruise segments linking together these various flight altitudes. On the basis of these flight plans, the FMS determines a lateral trajectory (also termed horizontal, corresponding to the horizontal flight plan) and a vertical trajectory (corresponding to the vertical flight plan). In the 2 axes, the trajectory is a set of geometric segments (straights, curves) joining together the elements of the flight plan. The transitions of the horizontal trajectory, for their part, make it possible to ensure that a flight plan is actually flyable, for example by defining a flyable circular arc between two successive straight segments. The transitions of the vertical trajectory make it possible to ensure that the vertical constraints and setpoints are properly complied with.

In the known systems of FMS type, the horizontal flight plans and trajectories on the one hand and vertical flight plans and trajectories on the other hand are produced separately. Initially, a horizontal trajectory is determined on the basis of the horizontal flight plan. Thereafter, a vertical trajectory is produced, on the basis of the vertical flight plan (constraints and setpoints in the vertical plane) and of the horizontal trajectory. As output of the vertical trajectory, the FMS has at its disposal the forecasts for altitude, speed, time, fuel, etc. As the turning radii of the lateral trajectory are dependent on the aeroplane altitude and speed, an iteration is performed on the flight plan and the lateral trajectory to adjust the angles of curvature (turns), thereby making it possible to obtain a flyable trajectory. This lateral trajectory having been recomputed, a new vertical trajectory must be generated. Loopbacks take place until the algorithm converges. In a general manner, the construction of the horizontal flight plan makes it possible to satisfy the constraints of trajectory segments, whereas the construction of the vertical flight plan makes it possible to satisfy the constraints pertaining to the flight domain of the aeroplane. These systems, though they make it possible to generate a flight plan which is flyable in a relatively simple manner and in a limited time, do not guarantee the optimality of the trajectory according to a criterion. Indeed, a non-optimal sequence of lateral and vertical flight phases can in particular bring a trajectory for which the optimization criterion exhibits improvement axes. A criterion for optimizing the trajectory can designate a property or a combination of properties of the trajectory to be maximized or minimized.

Document US 2010-0198433 (FORTIER, S et al.) describes a flight management system making it possible to recompute an optimal lateral trajectory in case of deviation from an initial flight plan, and to suggest a fuel-optimized lateral trajectory to an aircraft pilot.

Document U.S. Pat. No. 8,565,938 (COULMEAU, F. et al.) describes a method of vertical trajectory optimization associated with constraints and optimization parameters.

However, though the known techniques from the prior art make it possible to optimize horizontal and vertical trajectories separately, none makes it possible to apply a joint optimization. Thus, a vertical trajectory optimization can produce a change of flight phases which is unfavourable in respect of the combined horizontal-vertical trajectory. Likewise, if it is applied separately to the construction of a horizontal and vertical flight plan, a constraint in respect of the construction of the trajectory, for example of limit jerk, may produce a more unfavourable result for at least one optimization objective than if it is applied to a joint construction of horizontal and vertical flight plans.

A naive solution to this problem would be to perform several successive iterations of horizontal trajectory computation using the vertical trajectory and then of vertical trajectory computation using the horizontal trajectory so as to obtain a more and more optimized combined trajectory. However this method in no way guarantees, in the general case, convergence to the trajectory that is best optimized in a joint manner. It is moreover impossible to predict the computation time necessary to obtain an optimized trajectory, the former being related to the number of iterations necessary to satisfy a convergence-related stopping criterion. This is particularly problematic in the case of trajectory computations integrated into a piloting system, where it is desirable to compute a trajectory with a controlled duration.

In mathematical language, an optimization problem is a mathematical formalization of a search for an optimal solution to a problem, analytically or numerically. The standard mathematical formulation of an optimization problem in finite dimension comprises in particular the definition of a vector of the optimization parameters belonging to a space $R^n$, comprising the variables, parameters or unknowns; the definition of a function of $R^n$ in R, the so-called cost function, cost criterion or objective function; the definition of equality and inequality constraints applying to the variables; it is also possible to define a subset X of $R^n$ comprising the admissible values of the variables. Solving the optimization problem then consists in determining the values of the variables X which optimize (that is to say minimize or maximize) the cost function.

Optimal control problems are a subset of optimization problems, introduced by L. S. Pontryagin, V. G. Boltyanskii, R. V. Gamkrelidze and E. F. Mishchenko, The Mathematical Theory of Optimal Processes, Interscience 1962 ISBN 2881240771). An optimal control problem makes it possible to determine the control of a system which minimizes (or maximizes) a performance criterion, possibly under constraints.

A trajectory optimization problem can in particular be formalized as an optimal control problem, according to a specific formulation, termed a Bolza problem, in particular described by Bolza, O.: *Lectures on the Calculus of Variations*. Chelsea Publishing Company, 1094, available on Digital Mathematics library. $2^{nd}$ edition republished in 1961, paperback in 2005, ISBN 978-1-4181-8201-4. A Bolza problem can be solved by the so-called direct schemes, described in particular by B. Dacorogna, "*Direct Methods in the Calculus of Variations*", Springer-Verlag, ISBN 0-387-50491-5, or else F. Irene, G. Leoni, "*Modern Methods in the Calculus of Variations: $L^p$ Spaces*", Springer, ISN 978-0-387-35784-3.

Moreover, certain schemes make it possible to obtain information on the said constraints, in addition to an optimal trajectory according to the constraints formulated. For example, the Karush-Kuhn-Tucker parameters or conditions described in particular by H. W. Kuhn, A. Tucker, "*Non linear programming*", "*Proceedings of 2nd Berkeley Symposium*". Berkeley: University of California Press. pp. 481-492. MR 47303, make it possible to determine, after solving the problem, the constraints which were active or inactive, that is to say the constraints which have either made it impossible to solve the problem, or have limited the optimization of the cost function.

Although the optimization schemes, and in particular those using an optimal control problem setting, are known to make it possible to obtain the best theoretical solution to a trajectory computation problem, no practical solution based on these schemes exists today for computing an optimal trajectory in the case of a trajectory comprising several phases strung together in a way that is not predefined.

An aim of the invention is therefore to propose a method making it possible to predict a trajectory for an aircraft that jointly optimizes the horizontal and vertical flight plans, in particular by stringing together the horizontal and vertical flight phases in the most appropriate manner. Another aim of the invention is to identify, from among the various trajectory construction constraints, those which limit the joint horizontal and vertical optimization of the flight plan, so as to undertake the best balance between the various constraints and the optimization of the flight plan.

The notion of optimization designates the maximization or the minimization of an optimization criterion based on a property or a combination of properties of the trajectory. The optimization can in particular consist in predicting a trajectory which minimizes a cost criterion. A cost or optimization criterion can in particular apply to a property of the trajectory or a combination of properties of the trajectory, among which may for example be included:

Financial cost criteria, for example:
Fuel consumption;
Number of hours spent in flight (assuming that the flight personnel are paid in proportion to flight time);
Environmental criteria, for example:
Greenhouse effect gas emissions;
Carbon dioxide emissions;
Nitrogen dioxide emissions;
Sound nuisance;
Passenger comfort and satisfaction criteria:
Limitation of jerk;
Compliance with arrival time;
Etc. . . .

It is also possible to optimize a cost criterion combining several elementary criteria, for example a weighted sum of the fuel consumption and of the time spent in flight, or else a cost criterion integrating financial and environmental costs.

SUMMARY OF THE INVENTION

For this purpose, the invention describes a method for computing a setpoint trajectory of an aircraft, the said trajectory comprising at least two subsets, the said method comprising at least: a step of formulating at least one optimization problem for the said trajectory for at least one optimization criterion, the said formulating step comprising at least: a sub-step of formulating at least one constraint related to a transition of legs on at least one first subset of the trajectory; a sub-step of formulating at least one constraint related to a transition of vertical flight phases on at least one second subset of the trajectory; a step of solving the optimization problem for the said trajectory.

Advantageously, the step of formulating at least one optimization problem for the said trajectory furthermore comprises a sub-step of creating at least one first subset of the trajectory for at least one transition of legs, and a sub-step of creating at least one second subset of the trajectory for at least one transition of vertical phases.

Advantageously, the step of formulating an optimization problem for the trajectory furthermore comprises a sub-step of formulating at least one constraint related to a performance criterion of the aircraft on at least one subset of the trajectory.

Advantageously, the method comprises a prior step of initializing the trajectory.

Advantageously, the trajectory optimization problem minimizes a cost criterion.

In one embodiment of the invention, the cost criterion is a function of at least two properties of the trajectory.

Advantageously, the properties of the trajectory comprise at least two properties chosen among a group comprising fuel consumption, time spent in flight, carbon dioxide emissions, nitrogen dioxide emissions and noise generated.

Advantageously, the step of formulating the optimization problem for the said trajectory comprises a formulation of an optimal control problem on each of the subsets of the trajectory.

Advantageously, the said optimal control problem is a Bolza problem.

Advantageously, the method according to the invention comprises on completion of the solving of the trajectory optimization problem a step of analyzing the Karush-Kuhn-Tucker multipliers for at least one constraint.

In one embodiment of the invention, the method comprises, when at least one Karush-Kuhn-Tucker multiplier related to a constraint on a transition of legs or a vertical phase transition is non-zero, the modification of at least one flight phase.

In one embodiment of the invention, the modification of at least one flight phase comprises the inversion of a transition of legs and of a transition of phases of a vertical trajectory.

In one embodiment of the invention, the method comprises, when the Karush-Kuhn-Tucker multiplier of at least two constraints is non-zero, a step of selecting a constraint to be relaxed.

In one embodiment of the invention, the constraints are relaxed in a predefined order.

In one embodiment of the invention, the method comprises a step of displaying to a pilot constraints whose Karush-Kuhn-Tucker multiplier is non-zero.

In one embodiment of the invention, the method comprises a step of displaying at least two constraints so as to allow an operator to modify them.

The invention also relates to a trajectory computation system, comprising at least one processor configured to compute a setpoint trajectory of an aircraft, the said trajectory comprising at least two subsets, the said device comprising at least: a module configured to formulate at least one optimization problem for the said trajectory for at least one optimization criterion, the said module comprising at least: a sub-module for formulating at least one constraint related to a transition of legs on at least one flight phase; a sub-module for formulating at least one constraint related to a transition of vertical flight phases on at least one flight phase; a module configured to solve the optimization problem for the said trajectory for the said at least one optimization criterion.

Advantageously, the system comprises at least one man machine interface configured to display on at least one screen at least one constraint for a parameter of the trajectory, the computed value of the said parameter of the trajectory and the tolerance margin on the said constraint.

Advantageously, the said man-machine interface is configured to allow an operator to modify the tolerance value for the said at least one constraint.

The invention also relates to a computer program configured, when it is executed on a processor, to compute a setpoint trajectory of an aircraft, the said trajectory comprising at least two flight phases, the said computer program comprising at least: elements of computer code for executing a formulation of at least one optimal control problem for at least one optimization criterion, the said formulation comprising at least: a formulation of at least one constraint related to a transition of legs on at least one flight phase; a formulation of at least one constraint related to a transition of vertical flight phases on at least one flight phase; elements of computer code for solving the trajectory optimization problem for the said at least one optimization criterion.

The method according to the invention makes it possible to compute a setpoint trajectory in a more precise and optimized manner than the known prior art systems, since it directly integrates the coupling of the horizontal and vertical flight phases in the computation of the flight plan.

The method according to the invention is deterministic as regards response time, since it does not rely on iterative processes with convergence condition based exit but on iterative processes with known combinatorics of transitions, i.e. number of sets of transitions.

The method according to the invention makes it possible to detect non-optimal stringing together of flight phases, and to invert the transitions of legs and the vertical phase transitions when necessary.

The method according to the invention makes it possible to manage the constraints manually or automatically when no flyable trajectory satisfies all of the constraints.

The method according to the invention makes it possible to identify the constraints which limit the optimization of flight plans, both horizontal and vertical, and optionally to undertake balances between constraints of comfort type and the optimization of a cost criterion.

BRIEF DESCRIPTION OF THE DRAWINGS

Other characteristics will become apparent on reading the following nonlimiting detailed description given by way of example in conjunction with appended drawings which represent.

Certain acronyms usually used in the technical field of the present patent application will be able to be employed throughout the description. These acronyms are listed in the table hereinbelow, with in particular their expression and their meaning.

| Acronym | Expression | Meaning |
| --- | --- | --- |
| CAS | Calibrated Air Speed | Calibrated or conventional Air speed. Air speed computed by the onboard instruments. |
| DB | DataBase | Container making it possible to store and retrieve the whole of the information in relation to an activity. Generally in computerized form. |
| DME | Distance Measuring Equipment | Radio-transponder making it possible to ascertain the distance of an aircraft from a navigation database. Is generally used in combination with a VOR for aerial navigation. |
| FMD | Flight Management Display | Flight display system integrated into an FMS system |
| FMS | Flight Management System | Computerized system making it possible to compute aircraft trajectories and flight plans, and to provide the guidance setpoints suitable for the pilot or automatic pilot to follow the computed trajectory. |
| FPLN | Flight PLaN | Geographical elements set making up the skeleton of the trajectory of an aeroplane. A flight plan includes in particular a departure airport, an arrival airport, and waypoints. |
| KCCU | Keyboard Console Control Unit | Man Machine Interface that may be integrated into a cockpit comprising a keyboard so that the pilot can re-enter information into the FMS. |
| KKT | Karush-Kuhn-Tucker | Multiplier related to a constraint of an optimization problem. A non-zero value of a KKT multiplier signifies that the constraint was active when solving the optimization problem. |
| MCDU | Multi Control Display Unit | Man Machine Interface that may be integrated into a cockpit allowing the display and the input of a great deal of FMS related information. |
| ND | Navigation Display | Cockpit display element presenting the lateral flight trajectory. |
| NDB | Non directional Beacon | Radionavigation beacon making it possible to determine the aeroplane distance from the beacon, by use of compass |
| VD | Vertical Display | Display element that may be integrated into a cockpit, and displaying the vertical trajectory of the aircraft. |
| VHF | Very High Frequency | Part of the radioelectric spectrum ranging from 30 MHz to 300 MHz. |
| VOR | VHF Omnidirectional Range | Radioelectric positioning system used in aerial navigation and operating with VHF frequencies. |

DETAILED DESCRIPTION

In the subsequent description the method according to the invention is illustrated by examples relating to the computation of an aircraft setpoint trajectory in a computer on board an aircraft. It should however be noted that the invention is applicable to all the modes of computation of an aircraft trajectory comprising a step of initialization and a step of optimization of the trajectory. For example, the invention is applicable in the case of a trajectory computed initially on the ground and optimized by an onboard computer within the aircraft. It is also applicable in respect of a trajectory computed wholly on the ground, this computation comprising an initialization step and an optimization step.

Figure 1:
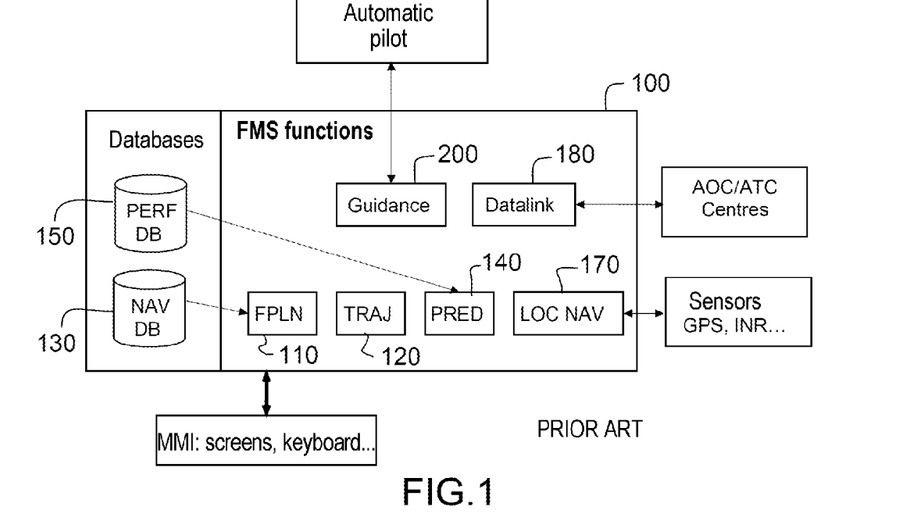
FIG. 1, a system of known FMS type of the prior art.

FIG. 1 represents a system of known FMS type of the prior art.

A flight management system can be implemented by at least one onboard computer embedded aboard the aircraft. The FMS 100 determines in particular a geometry of a flight plan profile followed by the aircraft. The trajectory is computed in four dimensions: three spatial dimensions and a time/speed profile dimension. The FMS 100 also transmits guidance setpoints computed by the FMS 100 to a pilot, via a first pilot interface, or to an automatic pilot, so as to follow the flight profile.

A flight management system can comprise one or more databases such as the database PERF DB 150, and the database NAV DB 130. The databases PERF DB 150 and NAV DB 130 comprise respectively performance data for the aircraft and aerial navigation data, such as routes and beacons.

The management of a flight plan according to the prior art can make use of means for flight plan creation/modification by the crew of the aircraft through one or more man machine interfaces, for example:

an MCDU;
a KCCU;
an FMD;
an ND.
a VD

A capability of the FMS 100 may be a flight plan management function 110, usually named FPLN. In particular, the FPLN capability 110 allows management of various geographical elements making up a skeleton of a route to be followed by the aircraft comprising: a departure airport, waypoints, airways to be followed, an arrival airport. The FPLN capability 110 also allows management of various procedures forming part of a flight plan such as: a departure procedure, an arrival procedure, one or more holding pattern procedures. The FPLN capability 110 allows in particular the creation, the modification, and the deletion of a primary or secondary flight plan.

The flight plan and its various information related in particular to the corresponding trajectory computed by the FMS can be displayed for consultation by the crew through display devices, also called man-machine interfaces, present in the cockpit of the aircraft such as an FMD, an ND, or a VD. The VD displays in particular a vertical flight profile.

The FPLN capability 110 makes use of data stored in databases PERF DB 150 and NAV DB 130 so as to construct a flight plan and the associated trajectory. For example, the database PERF DB 150 can comprise aerodynamic parameters of the aircraft, or else characteristics of the engines of the aircraft. It contains in particular the performance margins systematically applied in the prior art to guarantee safety margins in the descent and approach phases. The database NAV DB 130 may for example comprise the following elements: geographical points, beacons, airways, departure procedures, arrival procedures, altitude constraints, speed constraints or slope constraints.

A capability of the FMS, named TRAJ 120 in FIG. 1, makes it possible to compute a lateral trajectory for the flight plan defined by the FPLN capability 110. In particular, the TRAJ capability 120 constructs a continuous trajectory on the basis of points of an initial flight plan while complying with the aircraft's performance provided by the database PERF DB 150. The initial flight plan can be an active, temporary, secondary flight plan. The continuous trajectory can be presented to the pilot by means of one of the man machine interfaces.

A capability of the FMS 100 can be a trajectory prediction function PRED 140. In particular, the prediction function PRED 140 constructs a vertical profile optimized on the basis of the lateral trajectory of the aircraft, provided by the function TRAJ 120. To this end, the prediction function PRED 140 uses the data of the first database PERF DB 150. The vertical profile can be presented to the pilot by means for example of a VD.

A capability of the FMS 100 can be a location function 3, named LOCNAV 170 in FIG. 1. The function LOCNAV 170 performs, in particular, optimized geographical location, in real time, of the aircraft as a function of onboard geolocation means embedded aboard the aircraft.

A capability of the FMS 100 may be a guidance function 180. In particular, the guidance function 200 provides appropriate commands to the automatic pilot or to one of the man machine interfaces, making it possible to guide the aircraft in lateral and vertical geographical planes (altitude and speed) so that the said aircraft follows the trajectory scheduled in the initial flight plan.

Figure 2:
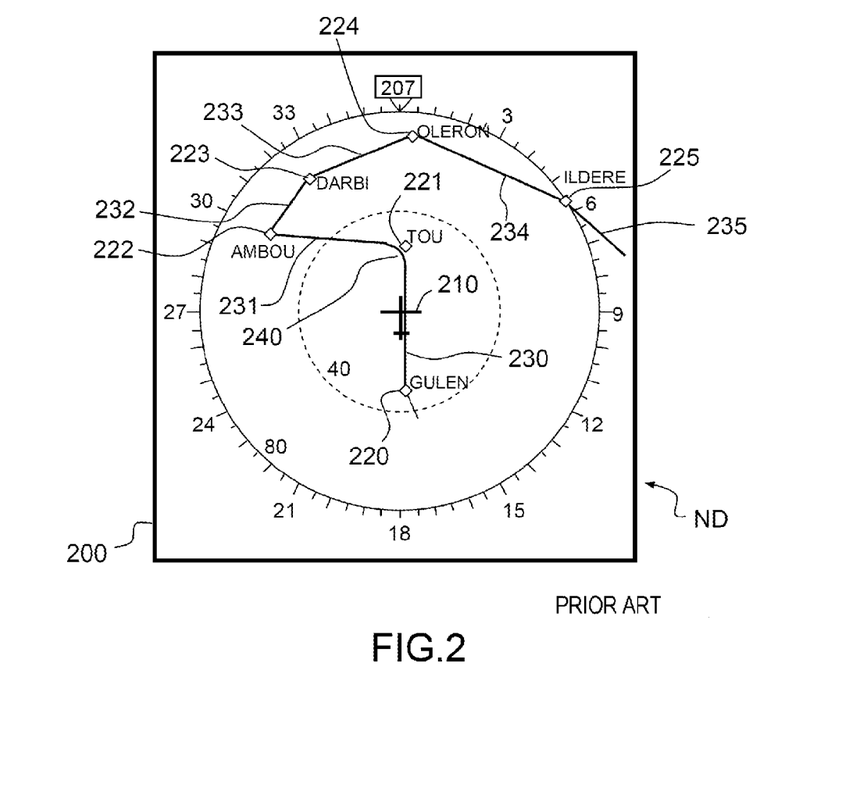
FIG. 2, a horizontal trajectory according to the prior art.

FIG. 2 represents a horizontal trajectory according to the prior art.

This horizontal trajectory is displayed on an item of equipment of ND type and its representation is centred on the position 210 of the aircraft. The skeleton of this trajectory is constructed on the basis of navigation points or waypoints 220, 221, 222, 223, 224, 225. These points may for example be contained in the base NAV DB 130. This may for example entail beacons of NDB or VOR type.

Horizontal flight phases or legs are constructed on the basis of these navigation points to form the horizontal skeleton of the trajectory of the aircraft. A leg specifies a set of constraints to be satisfied, as well as the transition to be performed to pass to the following leg. The trajectory satisfying the definition of the leg consists of a succession of lateral segments. A segment may be a straight line segment (or great circle), such as for example the legs 230, 231, 232, 233, 234 and 235. It may also be a curvilinear segment, for example the leg 240. During the construction of a horizontal trajectory, an FMS according to the prior art can use the performance of the aircraft to construct curvilinear segments having the appropriate radius of curvature.

Figure 3A:
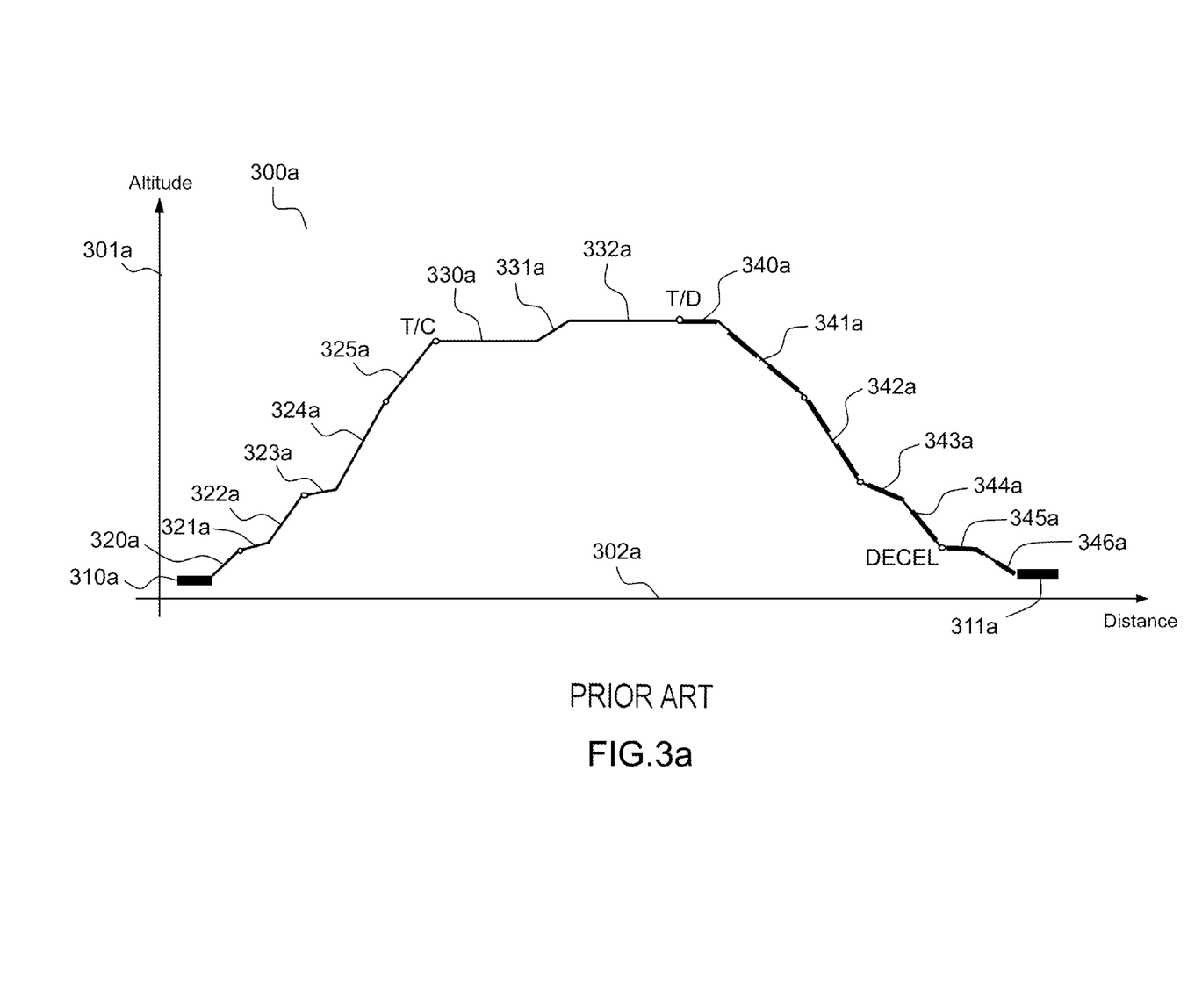
FIGS. 3a and 3b, respectively altitude and speed profiles according to the prior art.
Figure 3B:
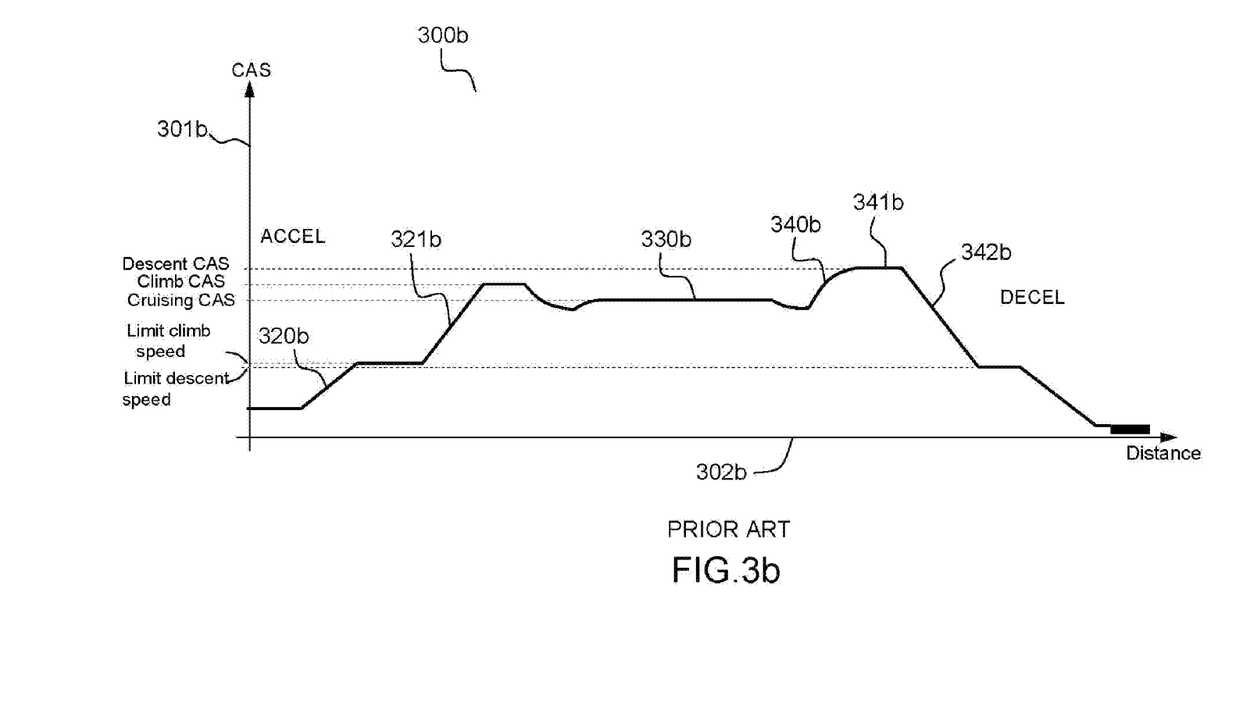

FIGS. 3*a* and 3*b* represent respectively altitude and speed profiles according to the prior art.

FIG. 3*a* represents a vertical altitude profile 300*a* for an aircraft trajectory. This profile represents the altitude of the aircraft, represented on the vertical axis 301*a*, as a function of the distance travelled since takeoff, represented on the horizontal axis 302*a*. This trajectory begins at the takeoff point 310*a* and terminates at the landing point 311*a*.

This vertical trajectory is formed of several successive vertical flight phases. Phases 320*a*, 321*a*, 322*a*, 323*a*, 324*a* and 325*a* form the climb of the aircraft. Flight phases 330*a*, 331*a* and 332*a* form the cruise. Finally, flight phases 340*a*, 341*a*, 342*a*, 343*a*, 344*a*, 345*a* and 346*a* form the descent.

FIG. 3*b* represents an exemplary speed profile for an aircraft trajectory. This profile 300*b* represents the evolution of the air speed, or CAS, as a function of the distance travelled by the aircraft. The air speed is represented on the vertical axis 301*b*, and the distance travelled by the aircraft on the horizontal axis 302*b*. In particular, this speed profile comprises two acceleration phases 320*b* and 321*b* during the climb phase. Phase 330*b* represents the optimal speed for decreasing the fuel consumption in the cruising phase. The descent phase is accompanied by a temporary increase in the air speed 340*b*, 341*b*, before a deceleration phase 342*b*.

The altitude profile 300*a* and speed profile 300*b*, coupled, form the vertical profile of the aircraft. The optimization of an aircraft trajectory, for example so as to limit the fuel consumption, can in particular be done by modifying the vertical phases of the vertical profile 300*a*, for example by modifying the climb lengths or altitudes. It can also be done by modulating the speeds within the profile 300*b*.

In an FMS system 100 according to the prior art, the horizontal profile of the trajectory is computed in the module TRAJ 120, and the vertical profile (in terms of altitude and speed) is computed in the module PRED, on the basis of the output from the module TRAJ. The optimization of the trajectory is therefore done in a manner separated between the optimization of the horizontal trajectory, and the optimization of the vertical trajectory, in terms of altitude and speed. This mode of computation does not make it possible to jointly optimize the horizontal and vertical profiles, and may therefore produce a sub-optimal trajectory.

Figure 4:
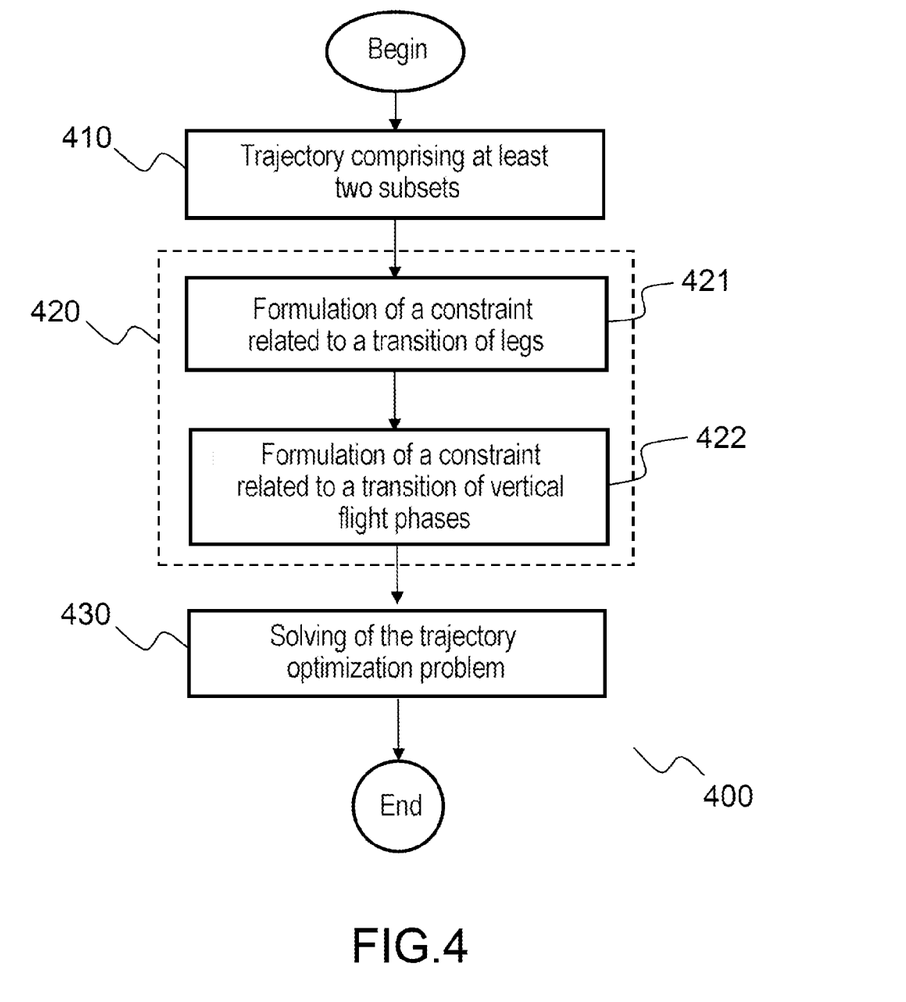
FIG. 4, a flow chart of a method according to the invention.

FIG. 4 represents a flow chart of a method according to the invention.

This method may for example be executed in an item of equipment of FMS type. It can also be executed in a ground station, and the trajectory dispatched to an aircraft via a ground-air link, or else be executed on an item of equipment present within the cockpit of the aircraft, for example a touchscreen tablet, comprising means for providing a trajectory prediction to the FMS.

This method applies to a trajectory 410 comprising at least two subsets. This trajectory may be for example a trajectory initialized with the aid of a method according to the prior art. The subsets of the trajectory may for example represent various flight phases, horizontal and/or vertical.

The method 400 comprises a step 420 of formulating a trajectory optimization problem for at least one optimization criterion. In one embodiment of the invention, the trajectory optimization problem is formulated in the form of an optimal control problem. It may for example be formulated in the form of a Bolza problem.

In one embodiment of the invention, the optimization criterion is a cost criterion to be minimized. This may for example entail a fuel consumption to be minimized. Advantageously, the cost criterion may be a weighted sum of at least two properties of the trajectory. Advantageously, these at least two properties comprise at least two properties chosen in particular from among a group comprising fuel consumption, time spent in flight, nitrogen dioxide emissions and noise generated.

The formulation of a trajectory optimization problem comprises in particular the formulation of constraints on the trajectory. The nature of these constraints may for example be distributed or pointlike. The distributed constraints are the constraints which apply at any instant on the trajectory or a subset of the trajectory. This may for example entail a Mach number defining the limit of the flight domain of the aeroplane, or a limit engine thrust never to be exceeded, or a heading to be maintained.

The pointwise constraints apply for their part to a precise point of the trajectory. This may for example be a departure time, an arrival time or else an altitude fixed by air traffic control to overfly a waypoint.

A trajectory optimization problem can apply to a trajectory as a whole. It is also possible to formulate a trajectory optimization problem for each subset of the trajectory, and to solve these problems jointly for the various subsets of the trajectory while ensuring continuity of the trajectory obtained between the various successive subsets of the trajectory. In the case of a formulation in the form of a Bolza problem, this technique is known in the mathematical field by the name "multi-phase Bolza problem".

The constraints can be formulated in a specific manner on each of the subsets of the trajectory. For example, the limit Mach number may be different on a subset of the trajectory corresponding to a cruising phase and a subset of the trajectory corresponding to a descent phase.

The transitions between the various horizontal and vertical flight phases generate constraints on the trajectory. For example, the transition between two successive legs can impose the overflying of a waypoint, sometimes at a precise altitude. The transitions between the vertical flight phases also generate constraints. The vertical flight phases may for example be associated with a start and end altitude, as well as optionally a limit speed at the start or at the end of the vertical phase.

In order to optimize the trajectory while complying with these constraints, step 420 of formulating a trajectory optimization problem comprises a sub-step 421 of formulating a constraint related to a transition between two successive legs on at least one subset of the trajectory, and a sub-step 422 of formulating a constraint related to a transition between two successive vertical flight phases on at least one second subset of the trajectory. In one embodiment of the invention, when the transition between two legs coincides with the limit between two successive subsets of the trajectory, the constraint related to the transition of legs is formulated on both subsets. In one embodiment of the invention, when the transition between two vertical flight phases coincides with the limit between two successive subsets of the trajectory, the constraint related to the transition between the two vertical flight phases is formulated on both subsets.

Finally, a method according to the invention comprises a step 430 of solving the trajectory optimization problem. This solving consists in determining a trajectory which optimizes at least one optimization criterion while complying with the constraints. When a trajectory optimization problem is formulated for each subset of the trajectory, step 430 solves the problem of optimizing the various subsets jointly, so as to ensure the continuity of the trajectory between the various subsets, while optimizing the at least one criterion on the trajectory as a whole.

Figure 5:
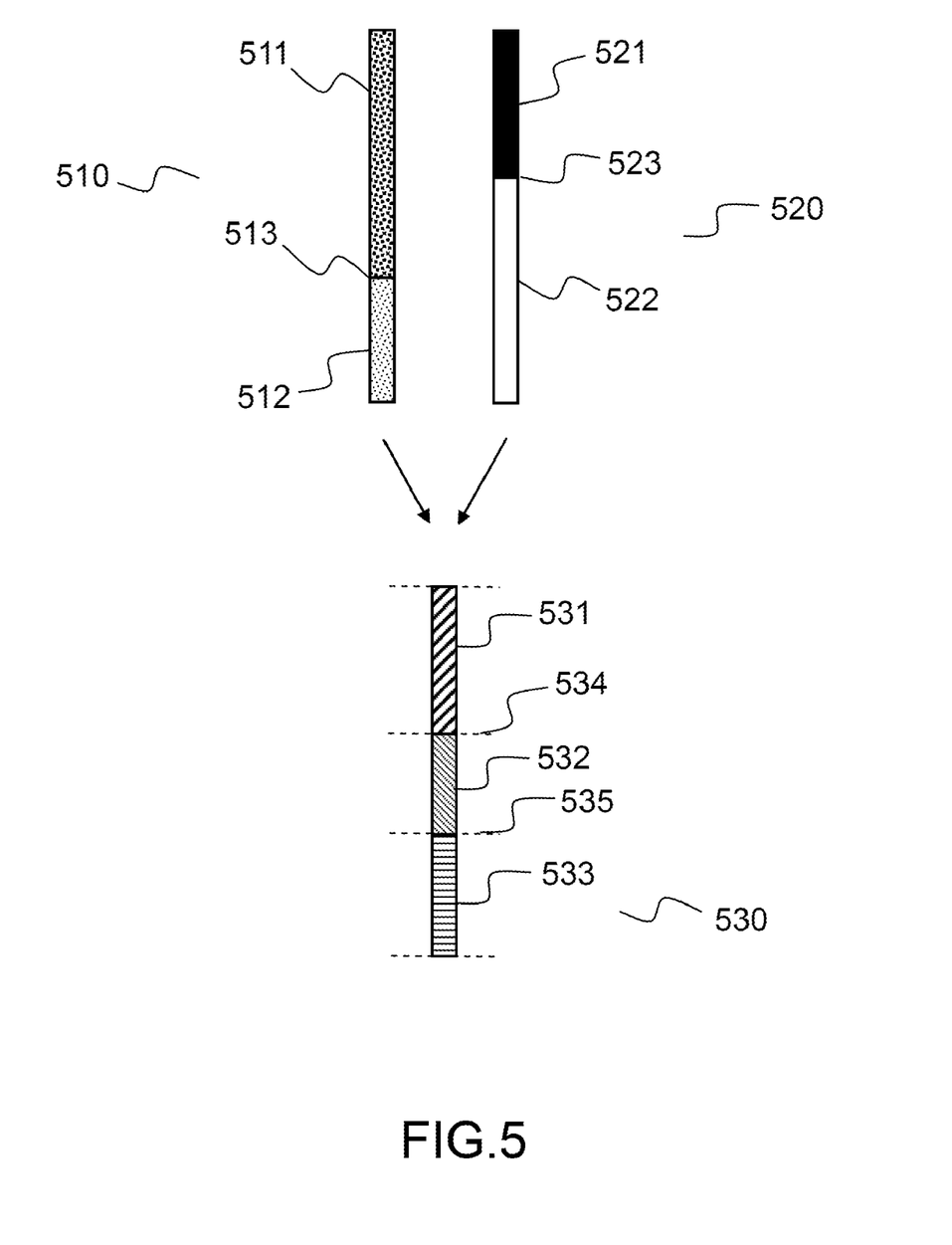
FIG. 5, an example of segmentation of a trajectory into subsets according to the transitions of legs and vertical phases.

FIG. 5 represents an example of segmentation of a trajectory into subsets according to the transitions of legs and vertical phases.

This segmentation, given solely by way of example, makes it possible to separate a trajectory into successive subsets according to the transitions between the legs and vertical phases.

This segmentation applies to an aircraft trajectory comprising a sequence of legs 510 and a sequence of vertical phases 520. This type of trajectory is common within the FMS systems according to the prior art. In this example, the sequence of legs 510 comprises two successive legs 511 and 512, separated by a transition of legs 513. The sequence of vertical phases 520 comprises two vertical phases 521 and 522, separated by a phase transition 523.

The segmentation then makes it possible to obtain a trajectory 530 comprising three subsets 531, 532, 533 separated by two transitions 534 and 535. The subsets 531, 532 and 533 then correspond respectively to the subsets of the trajectory which are situated at one and the same time within the leg 511 and within the vertical phase 521; at one and the same time within the leg 511 and within the vertical phase 522; at one and the same time within the leg 512 and within the vertical phase 522. The transitions 534 and 535 correspond for their part respectively to the transitions 523 and 513.

This segmentation is particularly advantageous. Indeed, it makes it possible to formulate the constraints on the various subsets of the trajectory in an effective manner, at one and the same time for distributed constraints and pointwise constraints. Indeed, each leg can be associated with specific distributed constraints. Advantageously, this segmentation makes it possible to formulate for each subset 531, 532, 533 of the trajectory the distributed constraints associated with the leg and with the vertical phase from which it arises.

This segmentation also makes it possible to effectively formulate the constraints related to the transitions between the flight phases, by formulating the constraints associated with a flight phase transition on the two subsets which arise therefrom. For example, the constraints related to the transition 523 between the vertical phases 521 and 522 can be formulated as a pointwise constraint at one and the same time at the final point of the subset 531 and at the initial point of the subset 532. Likewise, the constraints related to the transition of legs 513 can be formulated at one and the same time as a pointwise constraint at the final point of the subset 532 and at the initial point of the subset 533.

This segmentation is therefore particularly advantageous when the trajectory optimization problem is formulated as a set of optimization problems on the various subsets of the trajectory, for example when it is formulated in the form of a set of Bolza problems or of a multi-phase Bolza problem. Indeed, it makes it possible at one and the same time to effectively formulate the distributed constraints on each subset of the trajectory and to formulate the constraints related to the transitions between the flight phases as pointwise constraints at the limits of each of the subsets of the trajectory.

Figure 6:
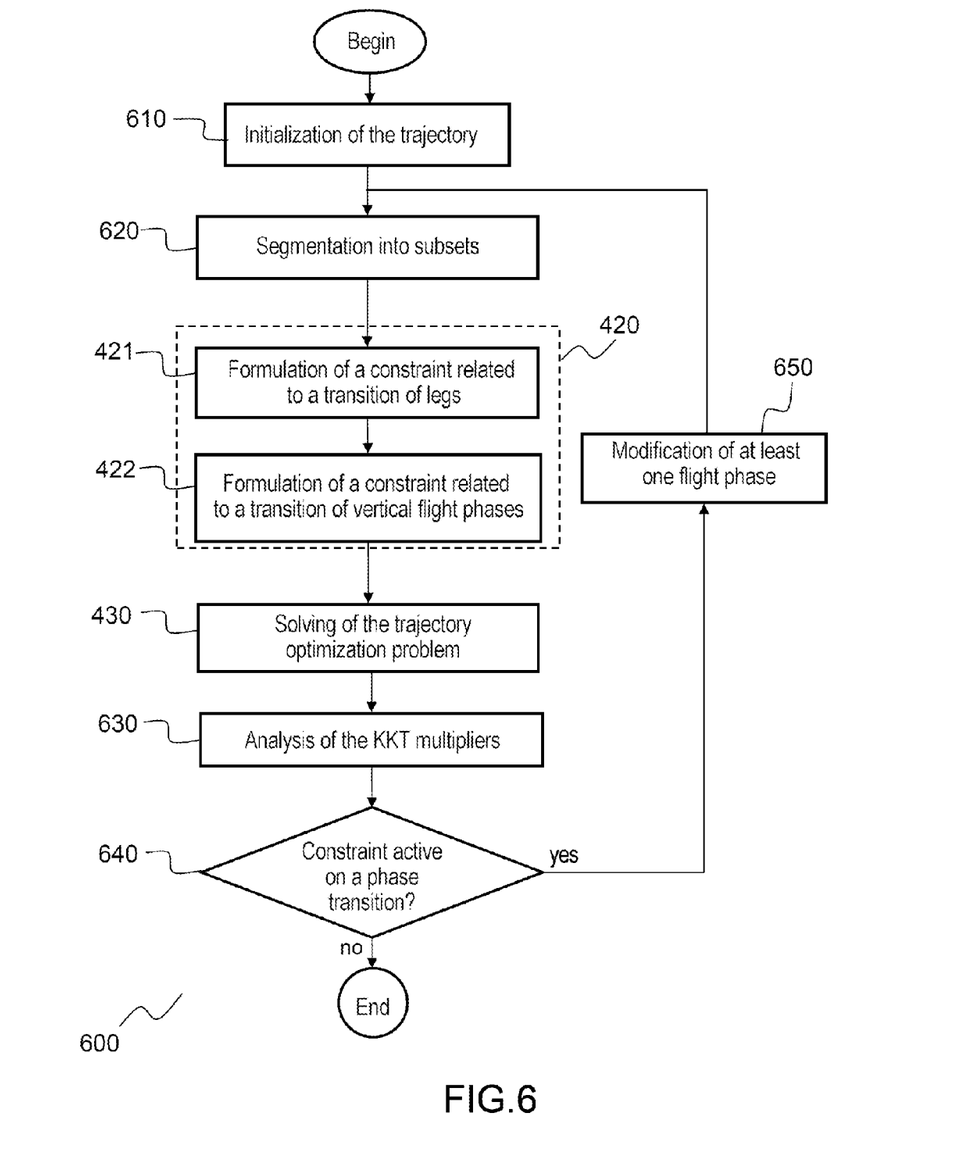
FIG. 6, a flow chart of an exemplary mode of implementation of a method according to the invention with optimization of the order of the phases of an aircraft trajectory.

FIG. 6 represents a flow chart of an exemplary mode of implementation of a method according to the invention with optimization of the order of the phases of an aircraft trajectory.

The method 600 according to this mode of implementation of the invention comprises a step 610 of initializing the trajectory. This step consists of a first computation of the trajectory, for example by a scheme according to the prior art or the application of a predefined trajectory.

The method 600 according to this mode of implementation of the invention thereafter comprises a step 620 of segmenting the trajectory into subsets. This step may for example comprise a segmentation similar to the segmentation 530, with the creation of a subset of the trajectory at each transition of legs and at each transition of vertical flight phases.

The method 600 thereafter comprises steps 420, 421 and 422 of formulating a trajectory optimization problem, and then step 430 of solving the trajectory optimization problem.

The method 600 thereafter comprises a step 630 of analyzing the constraints. The mathematical formulation of a trajectory optimization, optimal control or Bolza problem does indeed make it possible to analyse, after solving the problem, the effect of the constraints. A constraint is termed saturated or active when it has been limiting in respect of the optimization of the trajectory or if it could not be satisfied and has prevented a trajectory from being obtained. Conversely, the constraint is termed unsaturated or inactive if it had no impact on the optimization of the trajectory. A mathematical formulation suitable for determining the saturation of a constraint is the Karush-Kuhn-Tucker or KKT multiplier. A KKT multiplier is a value associated with a constraint and indicating the saturation of the latter. The schemes for solving a trajectory optimization problem of the prior art make it possible, during the computation of the trajectory which optimizes a criterion, to obtain the KKT multiplier for each of the constraints. The constraint is then considered to be saturated if the associated KKT multiplier is non-zero.

The method 600 thereafter comprises a step 640 of verifying the constraints related to the phase transitions. This step consists in verifying whether at least one KKT multiplier related to a pointwise constraint generated by a transition of legs, for example in step 421, or a pointwise constraint generated by a transition of vertical phases, for example in step 422, is active.

If no pointwise constraint related to a flight phase is active, this signifies that the ordering of the flight phases was of no consequence in the optimization of the trajectory, and therefore that the flight phases were forthwith in an optimal order. Conversely, if at least one constraint related to a change of phase is active, this signifies that a transition between two legs or two vertical phases has limited the optimization of the trajectory. This configuration can in particular arise when the transitions between the vertical and horizontal flight phases are arranged in a non-optimal order.

In order to alleviate this problem, the method 600 comprises, when at least one constraint related to a transition between two flight phases is active, a step 650 of modifying at least one flight phase. This step consists in modifying a flight phase comprising a transition whose associated constraint is active. This step may for example consist in inverting a transition of legs and a vertical phase transition. For example, for the trajectory 530, step 650 could comprise the inversion of the transition of legs 513 and of the transition of vertical phases 523. For example, if a subset of the trajectory possesses an active constraint related to a transition of legs at one of its ends, and an active constraint related to a transition of vertical phases at its other end, step 650 can comprise the inversion of these two transitions. It is also possible to delete certain lateral and/or vertical flight phases if they do not comply with certain constraints. For example, it is possible to formulate a "minimum duration" constraint on the transitions between two flight phases, so that each flight phase has an appreciable duration. If the "minimum duration" constraint is active for a flight phase, it may be preferable to delete it.

Once the flight phases have been modified, step 620 can be activated again so as to produce a new segmentation of the trajectory into subsets, and to formulate the constraints related to the new transitions of phases, and finally solve the trajectory optimization problem thus formulated.

This embodiment of the invention is particularly advantageous. It does indeed make it possible to optimize a trajectory while defining the optimal orders of transition between the vertical flight phases on the one hand, and between the legs on the other hand. This capability is not achievable with the prior art aircraft trajectory optimization schemes, which optimize the aircraft's horizontal and vertical flight profiles separately.

Figure 7:
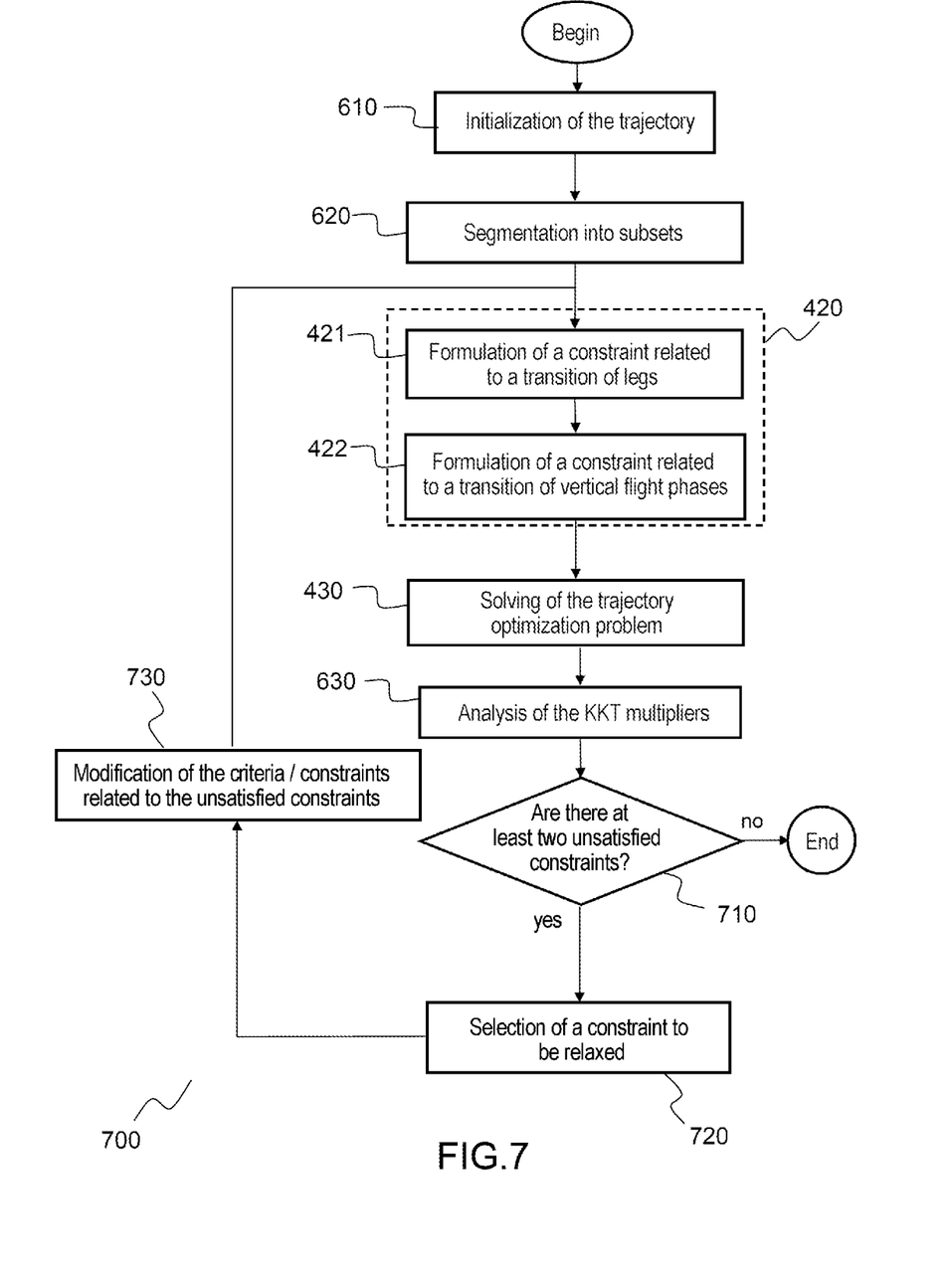
FIG. 7, a flow chart of an exemplary mode of implementation of a method according to the invention with choice of constraints to be modified.

FIG. 7 represents a flow chart of an exemplary mode of implementation of a method according to the invention with choice of constraints to be modified.

This mode of implementation of the method, given solely by way of example, comprises steps 420, 421, 422, 430, 610, 620 and 630 which are identical to those of the methods 400 and 600.

It furthermore comprises a step 710 of identifying the number of unsatisfied constraints. When the constraints on the optimization of the trajectory are too numerous or too significant, it is possible that step 430 of solving the trajectory optimization problem may not comprise any solution. The analysis of the KKT multipliers then makes it possible to identify the unsatisfied constraints. If there are at least two unsatisfied constraints, it is possible that the deleting or the relaxing of a single of the two constraints may make it possible to reinitialize the trajectory computation, and to obtain a solution.

When the KKT multiplier of at least two constraints is non-zero, the method 700 comprises a step 720 of selecting a constraint to be relaxed. This step makes it possible to select the most appropriate constraint to be relaxed so as to be able to compute an optimized trajectory.

Numerous modes of relaxation of constraints are possible. In one embodiment of the invention, the constraints are relaxed automatically in a predefined order. For example, the pointwise constraints may be relaxed before the distributed constraints. Likewise the constraints related to the comfort of the passengers may be relaxed before the constraints related to the performance of the aeroplane, these latter being able to be relaxed before the constraints related to safety.

In another embodiment of the invention, the constraints may be selected manually by an operator. For example, in the case of a trajectory computation within a system of FMS type, the constraints whose KKT multiplier is non-zero may be displayed to a pilot of the aircraft, who can then manually select the constraints to be relaxed. Likewise, the constraints may be displayed to a ground operator, who can then manually select constraints to be relaxed.

The method 700 thereafter comprises a step 730 of modifying the constraints so as to apply the relaxation to the at least one constraint to be relaxed. The relaxation of the constraints may for example be performed by increasing the tolerance on a constraint. For example, if a pointwise constraint consists of an exact transit time at a waypoint, it is possible to relax this constraint by associating a tolerance margin with the transit time, for example a tolerance of plus or minus two minutes. The relaxation of the constraints can also be performed by deleting a constraint. For example, if the trajectory is subject to a comfort constraint limiting the aeroplane's acceleration level, it is possible to delete this constraint.

Once the constraints have been modified, step 420 is reactivated so as to recompute a trajectory with the modified constraints. If the solving of the trajectory optimization problem still does not make it possible to compute a trajectory, it is possible to repeat the relaxation of a constraint and to recompute the trajectory again, and so on and so forth until it is possible to solve the trajectory optimization problem.

In one embodiment of the invention, it is also possible to make use of several schemes for initializing the trajectory. When constraints are unsatisfied, it is then possible to initialize the trajectory with a different initialization scheme. The reinitialization of the trajectory with different schemes can be performed prior to the deletion of constraints, or else after this if certain unsatisfied constraints could not be deleted.

This embodiment of the invention is particularly advantageous in that it makes it possible to select the constraint level just sufficient to be able to compute a trajectory, while computing the most optimized trajectory as a function of these constraints. It is also advantageous in the sense that it makes it possible to select the constraints to be relaxed in order of significance.

Figure 8A:
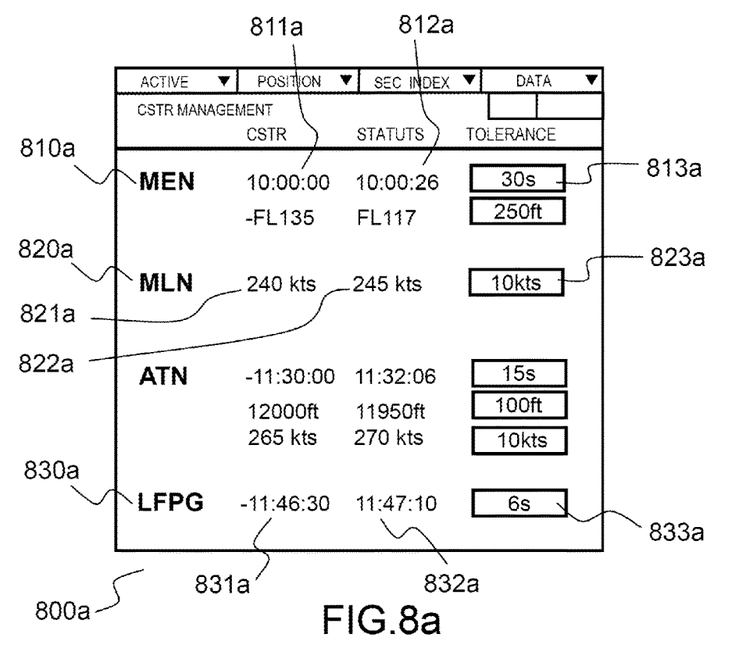
FIGS. 8a and 8b, respectively an example of displaying the constraints on the flight plan to the pilot and of modifying them.
Figure 8B:
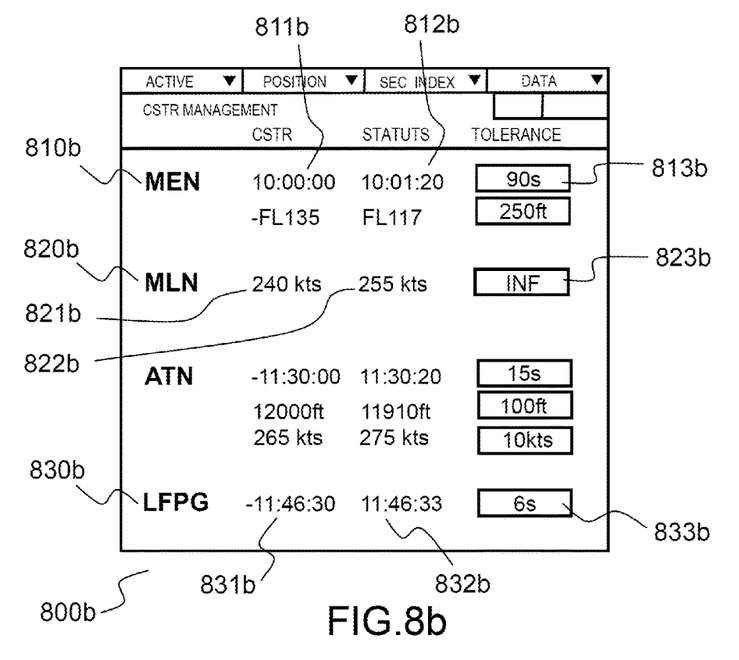

FIGS. 8a and 8b represent respectively an example of display to the pilot of the constraints on the flight plan and of their modification.

These displays can be implemented within an aircraft, for example to implement the method 700.

FIG. 8a represents an example of display 800a of constraints for the trajectory optimization. This display can be performed on a screen of an aircraft cockpit so as to be viewed by a pilot. In this example, the constraints are distributed constraints, formulated on waypoints, for example the waypoints MEN 810a and MLN 820a. The constraints may pertain to several parameters, for example the transit time at the waypoint MEN 811a being equal to 10 h or the speed at the waypoint MLN 821a being equal to 240 knots. In both these cases the values actually computed during the trajectory computation for these parameters are respectively a transit time of 10 h and 26 seconds at the waypoint MEN 812a and a speed of 245 knots at the waypoint MLN 822a. These constraints also comprise a tolerance, respectively 30 s for the transit time at the waypoint MEN 813a, and 10 knots for the speed at the waypoint MLN 823a.

Certain constraints are not satisfied. For example, the transit time constraint 831a at the waypoint LFPG 830a is not satisfied: the constraint is a transit at 11 hours, 46 minutes and 30 seconds, with a tolerance of 6 s 833a, whereas the transit time computed is 11 hours 47 minutes and 10 seconds 832a.

FIG. 8b represents an example of relaxing certain constraints and the result of a new iteration of computing the trajectory with the relaxed constraints.

In this example, the tolerance on the transit time at the waypoint MEN has been increased to 90 s 813b. Additionally, the tolerance on the speed at the waypoint MLN has been raised to infinity 823b. This amounts to cancelling the constraint.

By virtue of the relaxation of these two constraints, the time constraint 831b at the waypoint LFPG 830b has been able to be adhered to with an identical tolerance 833b. Indeed, the transit time 832b at the waypoint LFPG is 11 h, 46 minutes and 33 seconds for a constraint of 11 hours, 46 minutes and 33 seconds, and a tolerance of 6 seconds.

This example demonstrates the capability of a method according to the invention to optimize constraint adherence for a trajectory, and to perform selection of priority constraints to be adhered to or of constraints to be relaxed.

The examples hereinabove demonstrate the capability of a method according to the invention to compute a trajectory by optimizing at one and the same time the horizontal and vertical profiles of the trajectory, while complying with a set of constraints. They are, however, given merely by way of example and do not in any way limit the scope of the invention, defined in the claims hereinbelow.

The invention claimed is:

1. A method for computing an optimized setpoint trajectory of an aircraft, executed by a flight management system, the trajectory defining at least successive values of lateral position, altitude, and speed of the aircraft, the trajectory comprising at least two subsets, the method comprising at least:

a step of formulating at least one optimal control problem for the trajectory for at least one optimization criterion, the formulating step comprising at least:
a sub-step of formulating at least one constraint of said at least one optimal control problem related to a transition of legs on at least one first subset of the trajectory; and
a sub-step of formulating at least one constraint of said at least one optimal control problem related to a transition of vertical flight phases on at least one second subset of the trajectory;
a step of solving the optimal control problem for the trajectory; and
controlling an automatic pilot with the trajectory that was formulated using the solved optimal control problem.

2. The method according to claim 1, wherein the step of formulating at least one optimal control problem for the trajectory further comprises a sub-step of creating at least one first subset of the trajectory for at least one transition of legs, and a sub-step of creating at least one second subset of the trajectory for at least one transition of vertical phases.

3. The method according to claim 1, wherein the step of formulating at least one optimal control problem for the trajectory further comprises a sub-step of formulating at least one constraint related to a performance criterion of the aircraft on at least one subset of the trajectory.

4. The method according to claim 1, comprising a prior step of initializing the trajectory.

5. The method according to claim 1, wherein the at least one optimal control problem minimizes a cost criterion.

6. The method according to claim 5, wherein the cost criterion is a function of at least two properties of the trajectory.

7. The method according to claim 6, wherein the properties of the trajectory comprise at least two properties chosen among a group comprising fuel consumption, time spent in flight, carbon dioxide emissions, nitrogen dioxide emissions and noise generated.

8. The method according to claim 1, wherein the step of formulating the at least one optimal control problem for the trajectory comprises a formulation of an optimal control problem on each of the subsets of the trajectory.

9. The method according to claim 8, wherein the at least one optimal control problem is a Bolza problem.

10. The method according to claim 1, comprising on completion of the solving of the at least one optimal control problem a step of analyzing the Karush-Kuhn-Tucker multipliers for at least one constraint.

11. The method according to claim 10 comprising, when at least one Karush-Kuhn-Tucker multiplier related to a constraint on a transition of legs or a vertical phase transition is non-zero, the modification of at least one flight phase.

12. The method according to claim 11, wherein the modification of at least one flight phase comprises the inversion of a transition of legs and of a transition of phases of a vertical trajectory.

13. The method according to claim 10, comprising, when the Karush-Kuhn-Tucker multiplier of at least two constraints is non-zero, a step of selecting a constraint to be relaxed.

14. The method according to claim 13, wherein the constraints are relaxed in a predefined order.

15. The method according to claim 13, comprising a step of displaying to the pilot the constraints whose Karush-Kuhn-Tucker multiplier is non-zero.

16. The method according to claim 1, comprising a step of displaying at least two constraints so as to allow an operator to modify them.

17. A trajectory computation system, comprising at least one processor configured to compute an optimized setpoint trajectory of an aircraft, the trajectory defining at least successive values of lateral position, altitude, and speed of the aircraft, the trajectory comprising at least two subsets, the device comprising at least:
- a module configured to formulate at least one optimal control problem for the trajectory for at least one optimization criterion, the module comprising at least:
  - a sub-module for formulating at least one constraint of said at least one optimal control problem related to a transition of legs on at least one flight phase; and
  - a sub-module for formulating at least one constraint of said at least one optimal control problem related to a transition of vertical flight phases on at least one flight phase;
- a module configured to solve at least one optimal control problem for the trajectory for the at least one optimization criterion; and
- a module configured to control an automatic pilot with the trajectory that was formulated using the solved optimal control problem.

18. The system according to claim 17, comprising at least one man machine interface configured to display on at least one screen at least one constraint for a parameter of the trajectory, the computed value of the parameter of the trajectory and a tolerance margin on said at least one constraint.

19. The system according to claim 18, wherein the man machine interface is configured to allow an operator to modify the value of the tolerance for the at least one constraint.

20. A non-transitory computer-readable storage medium including a set of instructions executable by a processor of a flight management system, the set of instructions, when executed by the processor, causing the processor to perform operations to compute an optimized setpoint trajectory of an aircraft, the trajectory defining at least successive values of lateral position, altitude, and speed of the aircraft, the trajectory comprising at least two flight phases, said operations comprising:
- executing a formulation of at least one optimal control problem for at least one optimization criterion, the formulation comprising at least:
  - a formulation of at least one constraint of said at least one optimal control problem related to a transition of legs on at least one flight phase; and
  - a formulation of at least one constraint of said at least one optimal control problem related to a transition of vertical flight phases on at least one flight phase;
- solving said at least one optimal control problem for the trajectory for the at least one optimization criterion; and
- controlling an automatic pilot with the trajectory that was formulated using the solved optimal control problem.

* * * * *